United States Patent [19]

Reed

[11] 4,084,470

[45] Apr. 18, 1978

[54] CARBIDE TIPPED INSERTABLE SAW TOOTH

[76] Inventor: Jack K. Reed, c/o Reed's Carbide Service 1210 12th St., Lynchburg, Va. 24504

[21] Appl. No.: 685,100

[22] Filed: May 10, 1976

[51] Int. Cl.² .............................................. B27B 5/29
[52] U.S. Cl. ........................................ 83/841; 83/855
[58] Field of Search ................. 83/835, 855, 839, 840, 83/841, 844, 676

[56] References Cited

U.S. PATENT DOCUMENTS

| 1,105,153 | 7/1914 | McLean | 83/841 |
| 1,141,063 | 5/1915 | Kendall | 83/841 |
| 2,775,236 | 12/1956 | Blum | 83/841 X |
| 3,071,027 | 1/1963 | Hiltebrand | 83/840 X |
| 3,563,286 | 2/1971 | Strobel et al. | 83/855 |
| 3,885,488 | 5/1975 | Evancic et al. | 83/841 X |

FOREIGN PATENT DOCUMENTS

| 180,026 | 1/1907 | Germany | 83/841 |

*Primary Examiner*—Frank T. Yost
*Attorney, Agent, or Firm*—Littlepage, Quaintance, Murphy, Richardson, and Webner

[57] ABSTRACT

An insertable tooth for use in a slasher for paper pulp manufacture is disclosed to have a flat elongated plate of steel of even thickness having a rounded base and substantially parallel leading and following edges with a V-shaped groove extending along a lower major portion of the leading and following edges. The tooth also has a planar top angularly extending from a lower point on the following edge toward a higher point near the leading edge. A blade of a material having a hardness of at least 9 MOHS is inserted in a notch at the high point of the leading edge. The blade is in the form of a cubic trapezoid, the base of which is arranged essentially flush with the leading edge. The width of the base of the blade is greater than the thickness of the plate of steel forming the tooth. The sides of the blade are relieved from the base while the upper surface of the blade is arranged nearly coplanarly with or slightly above the planar top of the tooth.

2 Claims, 6 Drawing Figures

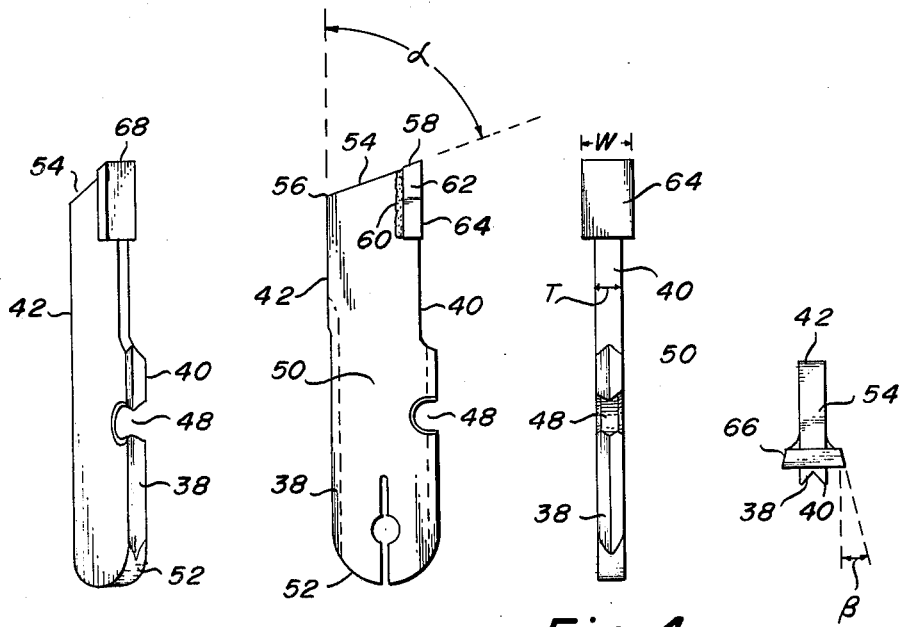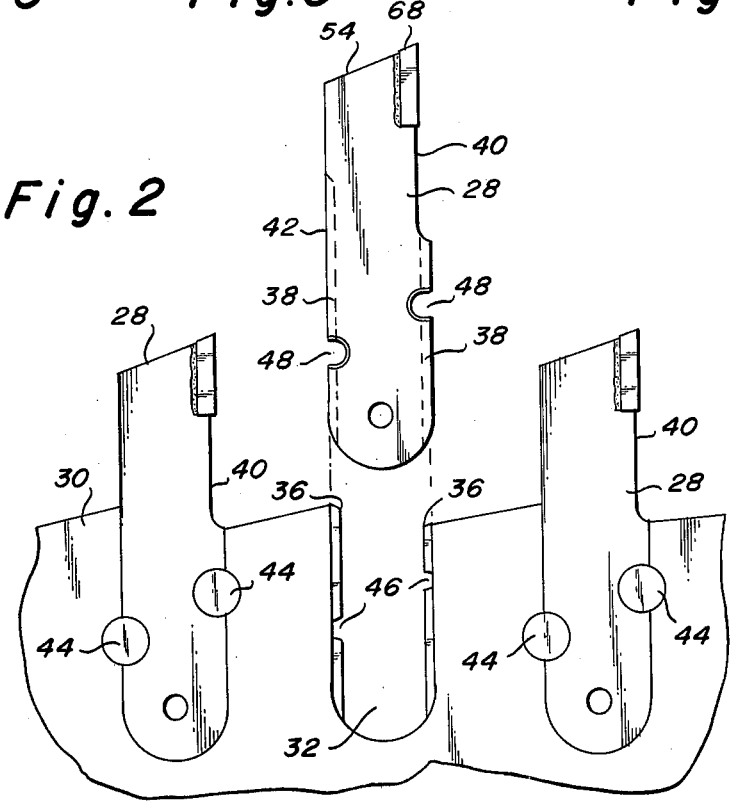

CARBIDE TIPPED INSERTABLE SAW TOOTH

BACKGROUND OF THE INVENTION (1) Field of the Invention

This invention relates to tooth inserts for use in a toothed blade and particularly its use in a slasher for paper pulp manufacture. The invention has as its main objective an insertable tooth having a greatly extended life time thereby permitting continuous use of toothed saws incorporating such an insertable tooth without the necessity of daily maintenance as is the standard practice with insertable teeth of the prior art.

2. Description of the Prior Art

Insertable teeth of the prior art used for cutting wood were generally elongated plate-like members of tool steel set in the periphery of and radially extending outward from a disc-shaped carrier which was adapted to be rotated about an axis perpendicular to the center of the disc. The insertable teeth were typically beveled to form a cutting edge in one plane, the teeth being alternately arranged and slightly offset so as to cut a kerf somewhat wider than the thickness of the plate steel actually forming each insertable tooth. The offset arrangement of each tooth was established by the presence of grooves on the leading and following edge of each insert coacting with beveled members adapted to extend into the groove, the beveled members being present in slots in the disc-shaped carrier adapted to receive the insertable teeth. One or more aperatures was typically provided for the insertion of rivets to hold the inserted teeth in place in the disc carrier. Examples of insertable teeth of the prior art are to be found in U.S. Pat. Nos. 560,426; 1,095,833; 1,141,063; 2,160,525; and 3,885,488.

As saws having insertable teeth of this type have been used as a slasher for paper pulp manufacture, it has been commonly experienced that the insertable teeth become sufficiently dull within four to eight hours use that the whole slasher blade must be removed and either new insertable teeth inserted or the old insertable teeth removed, sharpened, and then reinserted. While the cost of each insertable tooth is not large (typically less than $3.00) the amount of human labor involved in installing a complete set of insertable teeth in a slasher blade is considerable, the total upkeep costs ranging in the neighborhood of $1000 per day for each operating slasher. The high maintenance costs has heretofore prevented the general acceptance of the slasher blades using insertable teeth of this type. Further, slashers using insertable teeth of the prior art have been subject to considerable down time since the blade must be replaced every eight hours and is more typically replaced every four hours so as to achieve optimum performance.

Unlike the prior art, a slasher incorporating insertable teeth according to this invention, has been used continuously for periods of up to sixty days with no noticeable decline in performance. While the cost of producing each insertable tooth according to this invention is considerably more than in the prior art, typically three or four times the prior art cost, the extended life of the teeth and the concomitant savings experienced from significantly reduced down time and upkeep result in an overall lowering of costs for the operation and maintenance of a slasher of this type. While heretofore significant heat problems due to friction have been experienced in slashers of this type resulting in the burning or charring of wood surfaces thus rendering the wood unsuitable for paper pulp manufacture, the use of a blade according to this invention presents little or no frictional heat problem, thus significantly improving the output product of the paper pulp slasher.

SUMMARY OF THE INVENTION

These and many other advantages are to be experienced with a slasher used in paper pulp manufacture when equipped with insertable teeth according to this invention each of which comprise a flat elongated plate of steel of even thickness having a rounded base and substantially parallel leading and following edges with a V-shaped groove extending along a lower major portion of the leading and following edges. A planar top angularly extends from a lower point on the following edge toward a higher point near the leading edge of the insertable tooth. A blade of a material having a hardness of at least 9 MOHS in the form of a cubic trapezoid is inserted in a notch at the high point of the leading edge. The base of the blade is arranged substantially flush with or can extend slightly ahead of the leading edge. The width of the base is greater than and typically 1½ times the thickness of the plate forming the tooth. The sides of the blade are relieved from the base at an angle of between 2° and 20° and preferably between 10° and 15°. The upper surface of the blade is arranged substantially coplanarly with or extending slightly above the planar top of the tooth. The blade is preferably retained in the notch by brazing or otherwise solidly securing the blade to the plate forming the tooth.

Other features and characteristics of this invention will become apparent from the following description considered in connection with the various accompanying figures.

BRIEF DESCRIPTION OF THE DRAWINGS

FIG. 2 is an elevation detail of a portion of the slasher blade shown in FIG. 1.

FIG. 3 is an elevation side view of an insertable tooth according to this invention.

FIG. 4 is an elevation front view of the tooth shown in FIG. 3.

FIG. 5 is a plan view of the top of the insertable tooth shown in FIG. 3.

FIG. 6 is a perspective view of the insertable tooth shown in FIG. 3.

DESCRIPTION OF PREFERRED EMBODIMENTS

Figure 1:
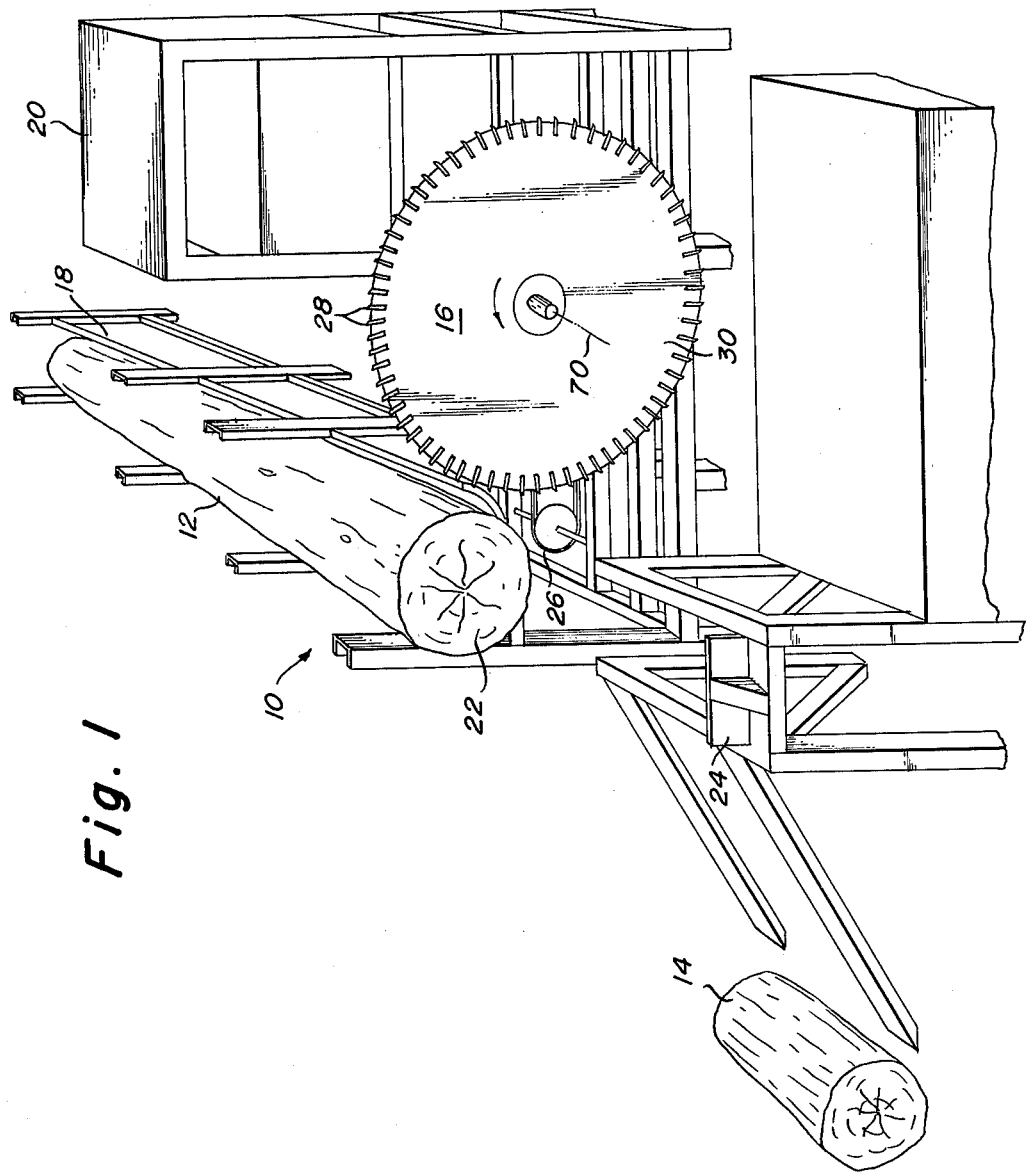
FIG. 1 is a perspective view of a slasher employing an insertable tooth blade according to this invention.

In FIG. 1 there is illustrated a slasher 10 for slashing logs 12 into blocks 14 of a linear dimension suitable for use in a paper pulp mill (not shown). The blocks 14 are usually required to have uniform linear dimensions, typically, 24, 32 or 48 inches. The logs 12 are periodically advanced toward the slasher blade 16 by a conveyor 18 under the control of the slasher operator who is advantageously located within a protective cage 20 and able to oversee the complete operation. The log 12 is advanced until the first end 22 comes in contact with a buck plate 24 whereupon the slasher blade 16 which is rotating in the direction indicated by the arrow is advanced toward the log 12 by an advancement mechanism 26. While the advancement mechanism illustrated is a driven chain and sprocket scheme, any suitable means for moving the rotating slasher blade 16 toward the log 12 may be used. In some slashers, particularly, where a plurality of slasher blades are used simultaneously, the log is advanced sideways toward the slasher blades which remain substantially fixed in position.

The slasher blade 16 is typically 48 inches to 72 inches in diameter and is driven at approximately 750 rpm by a 30 to 50 horsepower motor (not shown). The slasher blade 16 typically has about 100 insertable teeth 28 extending radially from the periphery of a central disc 30.

As illustrated in FIG. 2, the disc 30 has a plurality of radially extending slots 32 which are adapted to receive the slasher teeth 28. The slots 32 have parallel side walls 34 having knife edges 36 adapted to slide into and engage V-shaped grooves 38 extending along a lower major portion of the leading and following edges 40 and 42 respectively of each insertable tooth 28. One or more rivets 44 extend through the disc 30 when the insertable tooth 28 is in position, the rivet 44 engaging an indentation 46 in the side wall 34 and an indentation 48 in the tooth 28 in such a fashion as to retain the tooth 28 in the slasher disc 30.

As illustrated in FIGS. 3 through 6 the insertable slasher tooth 28 comprises a flat elongated plate of steel 50 of even thickness having a rounded base 52 and substantially parallel leading and following edges 40 and 42 respectively. A V-shaped groove 38 extends along a lower major portion of the leading and following edges. A planar top 54 extends from a lower point 56 on the following edge 42 toward a higher point 58 near the leading edge 40. The planar top 54 is angled at an angle α of between 50° to 80°. A notch 60 at the higher point 58 receives a blade 62 of a material having a hardness of at least 9 MOHS, for example, tungsten carbide, titanium carbide, or the like. The blade 62 has the form of a cubic trapezoid, and base 64 being arranged substantially flush with the leading edge 40. The base 64 can extend up to 0.15 inches, and preferably extends about 0.06 inches, in front of the leading edge 40. The width W of the base 64 is greater than and typically 1½ times the thickness T of the plate 50. The sides 66 of the blades 62 are relieved from the base 64 toward the following edge 42 at an angle β of between 2° and 20°, preferably between 10° and 15°. The upper surface 68 of the blade 62 is arranged substantially coplanarly with but slightly above said planar top 54. The blade 62 is retained in the notch 60 by any suitable means such as silver soldering, brazing, high strength adhesive or the like.

The insertable teeth 28 are intended to be positioned in disc 30 such that the upper surface 68 of each tooth 28 is positioned at the same radial distance from the axis of rotation 70 of the disc 30. Further, the teeth 28 are intended to be placed all in the same plane, one behind the other and not alternately staggered as was the prior art. This in-line arrangement of the teeth eliminates any necessity for any non-cutting, kerf clearing teeth as was often required by the prior art. It has been newly discovered that the relationship between the width W of the base 64 and the thickness T of plate 50 depends somewhat on the diameter of the disc 16 to which the teeth 28 are to be attached. While in smaller diameter discs of say 48 inches, the base 64 need be only 1.2 times the thickness T, in larger diametered blades of say 72 inches, the width W may need to be as much as 1.8 times the thickness T.

What is claimed is:

1. A slasher for use in paper pulp manufacture comprising a flat steel disc rotatable about an axis perpendicular to the center of the disc, the disc having a plurality of radially extending slots in the periphery thereof for receiving insertable teeth and a plurality of insertable teeth fixed in the slots, each tooth comprising a flat elongated plate of steel of even thickness having a rounded base, substantially parallel leading and following edges with a V-shaped groove extending along a lower major portion of the leading and following edges engaging the edges of the slots, a planar top angularly extending from an inner point on the following edge of the tooth toward an outer point near the leading edge of the tooth, the inner and outer points being radially outside of the outer edge of the disc, a notch at the outer point receiving a blade of material having a hardness of at least 9 MOHS in the form of a cubic trapezoid the base of which is arranged from 0.00 to 0.15 inches ahead of said leading edge, parallel to a radial line extending from the center of the disc, and perpendicular to the plane of the disc, the width of the base being between 1.2 and 1.8 times the thickness of said plate, the sides of the blade being relieved from the base at an angle of between 2° and 20°, the upper surface of the blade being arranged essentially coplanarly with but radially outward from said planar top, the blade being retained in said notch by brazing the blade to the plate.

2. The slasher of claim 1 wherein said plurality of insertable teeth are positioned in the same plane in an in-line arrangement, the upper surface of each tooth being positioned at substantially the same radial distance from said axis.

* * * * *